Jan. 27, 1953 — M. J. SMITH — 2,626,590
MILK LINE NIPPLE
Filed Jan. 5, 1949

INVENTOR
Marvin J. Smith
By Morris Spector
Atty.

Patented Jan. 27, 1953

2,626,590

UNITED STATES PATENT OFFICE 2,626,590

MILK LINE NIPPLE

Marvin J. Smith, Chicago, Ill., assignor to Rite-Way Products Company, Chicago, Ill., a corporation of Delaware Application January 5, 1949, Serial No. 69,310

5 Claims. (Cl. 119—14.54)

1

This invention relates primarily to milker nipples of the type that are used in connection with vacuum type milking machines for receiving a milk line hose, and wherein when the hose is flexed downwardly it is desired that the hose shall act as a valve to close the opening at the top of the milk line nipple. Nipples of the above mentioned character are generally provided for connection with the rubber hose that leads to the inflation of a teat cup of a milking machine. Sometimes the nipple is part of a milker claw and at other times the nipple is part of a milk receptacle that is suspended beneath the cow being milked. In either case the arrangement is such that if the teat cup is removed or drops from the cow's teat and permitted to hang downwardly from the nipple, the teat cup hose provides an automatic shut-off for the top of the nipple.

In accordance with the preferred embodiment of the present invention the nipple is made as a separate tube which is adapted to be completely fabricated and then inserted into the milker claw. This permits the performance of machining operations on the nipple in a simple manner.

The nipple of the present invention comprises a metal tube of circular cross section. The hose that is to be slipped over the outside of the tube is, of course, also of circular cross section. In its normal position the nipple extends at an angle of approximately 45° to the horizontal. If a round hose is slipped over the end of the tube and then the projected portion of the hose is permitted to drop and hang downwardly, then the top of the nipple should have a shape closely approximating the shape of the inside of the hose in order to obtain the most effective shut-off action. I have discovered that the shape of the surface at the top of the nipple opening is very important in controlling the effectiveness of the vacuum cut-off. I have also discovered that superior results are obtained if the top surface of tthe nipple is beveled with respect to the walls of the nipple and that this bevel should, for optimum results, coincide substantially with a conical surface whose axis is spaced substantially from the longitudinal axis of the milk line tube.

It is an object of the present invention to provide a cut-off surface for a nipple which cut-off surface may be made by mounting the nipple in a lathe and turning the nipple as it is being machined.

The attainment of the above and further objects of the present invention will be apparent from the following specification taken in conjunction with the accompanying drawing forming a part thereof.

In the drawing.

Reference may now be had more particularly to the drawing wherein like reference numerals designate like parts throughout.

Figures 1, 3:
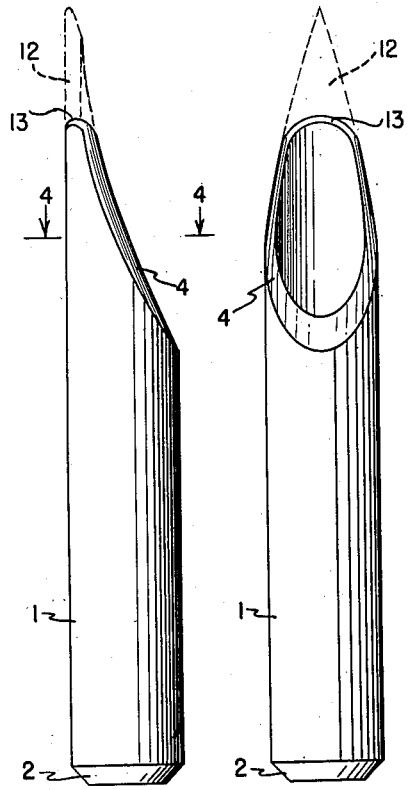
Figure 1 is a longitudinal view of a milker claw nipple embodying the present invention and showing in dotted lines a part of the method of construction of the same.
Figure 3 is a longitudinal view taken at right angles to Figure 1.
Figure 2:
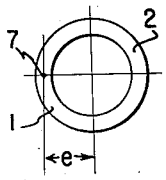
Figure 2 is a bottom view thereof.
Figure 4:
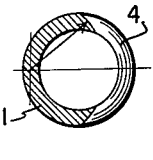
Figure 4 is a sectional view taken along the line 4—4 of Figure 1.
Figure 5:
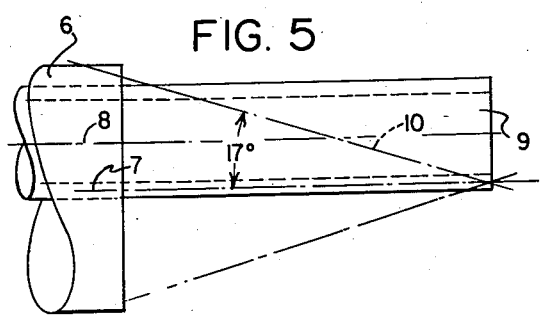
Figure 5 is a diagrammatic view further illustrating the manner of construction of the nipple of Figure 1.

The nipple of the present invention, designated in general by the reference numeral 1, comprises a circular, seamless tube of brass or the like. The bottom of the tube is chamfered at approximately 45°, as indicated at 2. The opposite end of the nipple is then machined to produce the desired curved surface 4. The machining is accomplished by mounting one end of the tube in a chuck 6 that is rotatable about an axis of rotation 7. The tube is mounted in the chuck 6 with the longitudinal axis 8 of tthe tube parallel to the axis of rotation 7 but spaced therefrom a distance e approximately equal to the internal radius of the tube plus half of the thickness of the tube, so that the axis of rotation 7 passes approximately through the center of the wall of the tube. With the tube thus mounted in the chuck the tube and the chuck are rotatable about the axis of rotation 7 and as the tube is being rotated the end of the metal at 9 (Fig. 5) is cut away, the cut being along an imaginary conical surface 10 the longitudinal axis of rotation of which is coincident with the axis of rotation 7. This means that the resulting end surface of the tube 1 where it is cut is a surface of a portion of a cone whose longitudinal axis is parallel with the longitudinal axis of the tube, and whose axis is the axis 7 in the wall of the nipple 1. The angle of cut 10 is preferably an angle of 17° with respect to the axis 7.

After the end of the nipple has been thus cut the pointed end portion 12 is then cut away and the lip 13 is rounded, as indicated in the drawing, to avoid all sharp edges. In this construction it is clear that the surface 4 is a surface of revolution, more specifically, the curvature of the surface 4 is a conical surface the vertical axis of which is along the line 7 that is parallel to the longitudinal axis of the tube 1 and spaced therefrom in the manner previously described.

Figure 6:
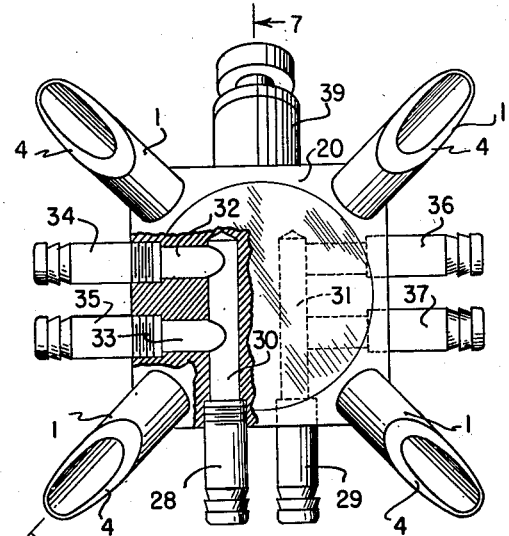
Figure 6 is a top view, in partial section, of a milker claw embodying the present invention.
Figure 7:
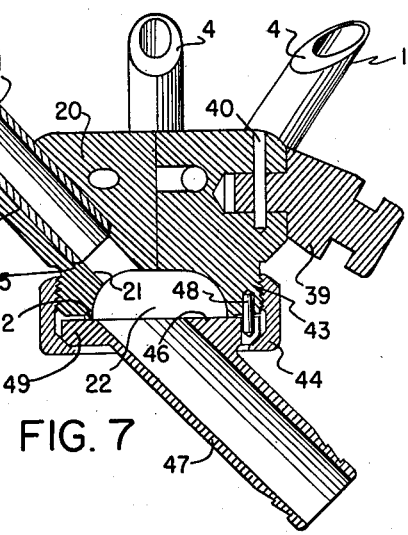
Figure 7 is a sectional view taken along the line 7—7 of Figure 6.

In Figures 6 and 7 I have shown the nipple 1 as applied to a milker claw. The claw of Figures 6 and 7 consists of a solid body 20 of brass or the like that has four milk nipple-receiving openings 21 all opening into a cavity 22 and extending upwardly and outwardly from said cavity so that the longitudinal center lines of all four of the openings 21 lie on the surface of an imaginary right angle cone. Each one of the openings or bores is counterbored at 23 to receive one of the nipples 1. Each of the nipples 1 is press fitted into the opening or bore 23 making a very tight press fit therein. In order to assure a tight press fit at the bottom conical surface 2 of the nipple 1 the corresponding end 25 of the counterbore 23 is tapered at an angle somewhat sharper than 45° to the longitudinal axis of the bore, and the nipple is pressed in hard so that the joint at the bottom of the nipple is closed by deformation of the bottom 2 of the nipple. The bore 21 is of exactly the same diameter as the inside diameter of the nipple 1. After the nipple has been pressed into place the bore 21 of the claw body and the corresponding interior surface of the nipple 1 are reamed smooth.

The claw body 20 has the usual pair of vacuum line-receiving nipples 28—29 which communicate with separate bores 30—31 in the body of the nipple, the bore 30 communicating with a pair of bores 32—33 at right angles thereto, which in turn communicate with inflation hose-receiving nipples 34—35. The bore 31 similarly communicates with corresponding nipples 36—37 as is well known in the art. The claw body is also provided with a hang-up hook 39 that has a shank which is press fitted into a hole in the claw body and locked in place by a press fitted pin 40.

The bottom of the claw has a flat planar surface 42, lapped smooth. The claw body is provided with a screw threaded neck portion 43 on which is threaded a ring 44 for holding the flat top surface 46 of a milk line nipple 47 against the surface 42. The pin 48 driven into a hole in the bottom of the claw body cooperates with a suitable slot in a flange 49 of the nipple 47 for fixing the angularity of that nipple.

When the claw is used, in the usual and well known manner, one end of each of four rubber milk tubes is slipped over each of the four nipples 1. The opposite end of each milk tube terminates at the inflation of the teat cup. In operation of the milker vacuum is continuously applied to the nipples 1. When putting the teat cups on or off of the cow's teats, one at a time, or when a teat cup drops, as by accident, it is desirable that the rubber milk tube from that inflation should shut off the top of the opening of the corresponding nipple 1 for reasons well known in the art. I have discovered that by making the surface 4 of the nipple 1 in the form of a surface of revolution of the specific shape above referred to, the shut-off action is very greatly enhanced. This is of particular importance during the time the teat cups are being applied to the cow's teats, one at a time. During such operation the dairyman holds the claw in one hand and raises the inflations, one at a time, and positions them on the cow's teats. As the successive inflations are being applied the remaining inflations are hanging downwardly from the claw held in the dairyman's hand. It is important that there shall be a good vacuum shut-off at those nipples where the inflations are still hanging downwardly from the claw.

I have found that with a nipple constructed as hereinabove set forth there is less rubbing and wear on the inside of the rubber hose that is applied to the nipple than in the case of nipples of the prior art. In the constructions of the past there was frequently the tendency for the nipple to cut the rubber hose as the hose is being slipped onto the nipple and as the hose is being flexed on the nipple in use. That has resulted in frequent cutting of the hose to the extent of puncturing the same. In the present case such cutting or wearing action on the hose is very greatly reduced. As a result the smoothness on the inside of the rubber hose is maintained for long periods of time. This not only reduces the likelihood of formation of air leaks due to tube bending, but what is more important facilitates the maintenance of a clean and sanitary condition at the bottom interior of the rubber tube.

In compliance with the requirements of the patent statutes I have here shown and described a preferred embodiment of my invention. It is, however, to be understood that the invention is not limited to the precise construction here shown, the same being merely illustrative of the principles of the invention.

What I consider new and desire to secure by Letters Patent is:

1. A milker claw comprising a body having a plurality of milk line nipples extending upwardly therefrom, each of said nipples comprising a tube the upper end of which is at an inclination to the longitudinal axis of the tube, the tube top being beveled with respect to the upper edge of the inner surface of the tube, the bevel being along a surface of revolution.

2. A milker claw comprising a body having a plurality of milk nipple-receiving openings at the top thereof and extending downwardly into the body, milk line nipples fitting in said openings and extending upwardly therefrom, each of said nipples comprising a tube the upper end of which is at an inclination to the longitudinal axis of the tube, the tube top being beveled with respect to the upper edge of the inner surface of the tube, the bevel being along a surface of revolution centered about an axis spaced from the longitudinal axis of the tube and parallel to the longitudinal axis of the tube.

3. In a milking apparatus, a nipple for receiving a flexible hose, said nipple comprising a tube the upper end of which is at an acute angle to the longitudinal axis of the tube and coincides with a portion of a surface of a cone whose longitudinal axis is spaced from the longitudinal axis of the tube, the wall of the tube at the foremost edge of the nipple being rounded along smooth curves and devoid of all sharp corners and edges.

4. In a vacuum type milker, a nipple having an inwardly facing seat comprising the tube wall, the seat being of the shape of the surface of intersection of the tube with a cone whose longitudinal axis is parallel to the longitudinal axis of the tube and spaced therefrom an amount of the order of the radius of the tube.

5. In a vacuum type milker, a nipple having an inwardly facing seat comprising the tube wall, the seat being of the shape of the surface of intersection of the tube with a cone whose longitudinal axis is parallel to the longitudinal axis of the tube and spaced therefrom an amount of the order of the radius of the tube, the uppermost portion of the tube wall closest to the longitudinal axis of the cone terminating short of intersection with the cone, and the wall thickness of the tube at that portion being rounded.

MARVIN J. SMITH.

REFERENCES CITED

The following references are of record in the file of this patent:

UNITED STATES PATENTS

| Number | Name | Date |
|---|---|---|
| 1,479,014 | Stampen | Jan. 1, 1924 |
| 1,583,580 | Dinesen | May 4, 1926 |
| 1,859,214 | McCornack | May 17, 1932 |
| 2,329,396 | Dinesen | Sept. 14, 1943 |
| 2,409,979 | Huber | Oct. 22, 1946 |
| 2,418,312 | Michelman | Apr. 1, 1947 |
| 2,428,350 | Anderson | Oct. 7, 1947 |
| 2,429,983 | Bender et al. | Nov. 4, 1947 |
| 2,437,697 | Kalom | Mar. 16, 1948 |
| 2,463,920 | Thomas | Mar. 8, 1949 |
| 2,473,191 | Bettencourt | June 14, 1949 |
| 2,518,589 | Anderson | Aug. 15, 1950 |

FOREIGN PATENTS

| Number | Country | Date |
|---|---|---|
| 577,367 | France | June 4, 1924 |
| 620,780 | Great Britain | Mar. 30, 1949 |